United States Patent [19]
Yu et al.

[11] Patent Number: 6,129,598
[45] Date of Patent: Oct. 10, 2000

[54] PRINTED-CIRCUIT-BOARD (PCB) IN A POWER SUPPLY SYSTEM INCLUDES INTEGRATED CABLE CONNECTION TERMINALS

[75] Inventors: Chen Yu Timothy Yu, Taipei; Jui-Yuan Hsu, Tauyuan, both of Taiwan

[73] Assignee: Delta Electronic, Inc., Taipei, Taiwan

[21] Appl. No.: 08/879,663

[22] Filed: Jun. 23, 1997

[51] Int. Cl.[7] ...................................................... G06F 1/18
[52] U.S. Cl. ........................... 439/883; 307/28; 439/76.1; 439/907
[58] Field of Search .................................. 439/502, 505, 439/638, 883, 947, 76.1, 907; 361/683, 686; 307/28, 18, 38, 39, 139, 26

[56] References Cited

U.S. PATENT DOCUMENTS

| | | | |
|---|---|---|---|
| 2,659,876 | 11/1953 | Dupre et al. | 439/846 |
| 4,922,125 | 5/1990 | Casanova | 361/683 |
| 5,006,960 | 4/1991 | Kallin et al. | 439/449 |
| 5,333,098 | 7/1994 | DeLuca et al. | 361/685 |
| 5,567,180 | 10/1996 | Seo | 439/638 |
| 5,777,397 | 7/1998 | Lam | 307/38 |
| 5,822,181 | 10/1998 | Jung | 361/683 |
| 5,852,544 | 12/1998 | Lee | 361/683 |

FOREIGN PATENT DOCUMENTS

| | | | |
|---|---|---|---|
| 2-288176 | 11/1990 | Japan | 439/502 |

*Primary Examiner*—Neil Abrams
*Attorney, Agent, or Firm*—Bo-In LIn

[57] ABSTRACT

The present invention discloses a power supply system with modularized and integrated cable interface configuration for providing power from an external power source to a plurality of subsystems in a personal computer. The power supply system includes a power cable for connecting the power supply system to the external power source. The power supply system further includes an output (O/P) cable having a first end and second end, the O/P cable including a plurality of cable groups wherein each of the cable groups including a subsystem plug module on the first end for connecting to a corresponding PC subsystems. The power supply system further includes an integrated PC receptive module for providing an interface with the O/P cable. The O/P cable further including an integrated O/P cable plug module on the second end for plugging the O/P cable into the integrated receptive module, wherein the integrated O/P plug module being in electric connection to each of the cable groups. The O/P cable of the power supply system may be conveniently removed and separately designed and manufactured for connection to different types of the personal computers. In another preferred embodiment, the integrated PC receptive module is a standardized module suitable for providing power to many different types for the PC subsystems by utilizing different designs and combinations of the O/P cable groups.

6 Claims, 14 Drawing Sheets

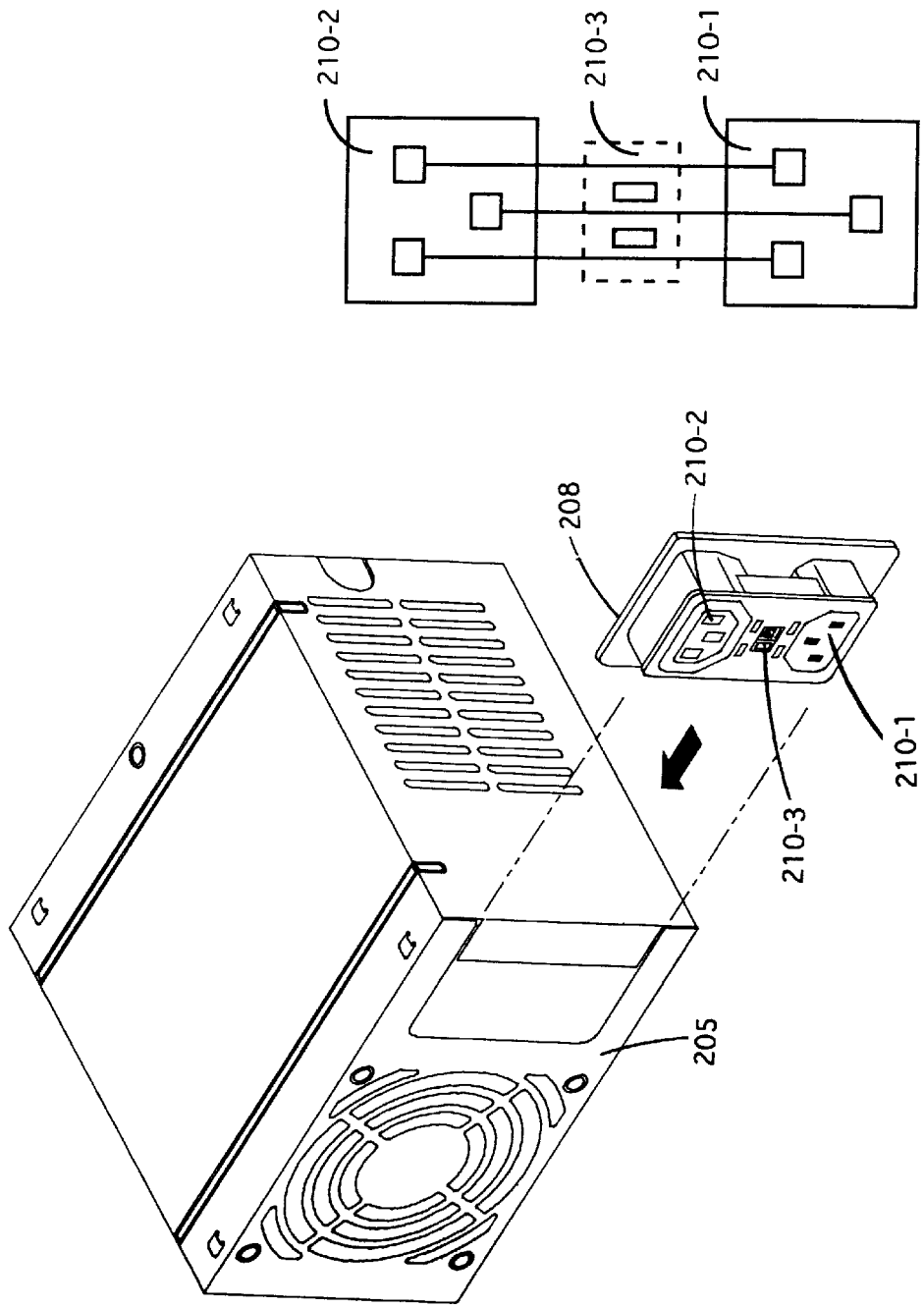

PRINTED-CIRCUIT-BOARD (PCB) IN A
POWER SUPPLY SYSTEM INCLUDES
INTEGRATED CABLE CONNECTION
TERMINALS

This Patent Application incorporates by reference the disclosure of a pending Parent Patent Application with Ser. No. 08/784,782 filed on Jan. 16, 1997 now U.S. Pat. No. 5,855,064 which is a Divisional Patent Application of an original Patent Application with Ser. No. 08/249,145 filed on May 25, 1994 and now abandoned. The application Ser. No. 08/784,782 and the U.S. Pat. No. 5,855,064 by Chang are assigned to a common owner of this invention.

BACKGROUND OF THE INVENTION

1. Field of the Invention

This invention relates generally to a power supply system for a personal computer (PC). More particularly, this invention relates to a new approach to design and manufacture the power supply system with a modularized and integrated cable interface for connecting a plurality of output (O/P) cable-groups to several standard output (O/P) cable terminals on a printed circuit board (PCB) in the power supply system for providing power from an external power source for supplying DC power at predefined voltage level to each subsystem of a personal computer via these several O/P cable groups.

2. Description of the Prior Art

The power supply system for a personal computer are required to provide power to increasingly more 'peripherals', such as modem-facsimile, compact disk (C-D) driver, scanners, hard-disk drives, floppy disk drives, etc. Due to current trend of development in personal computers, it can be expected that such trend will continue. Particularly when the microprocessor which is generally referred to as the central processing unit (CPU) are becoming more powerful and capable to manage multimedia, multitask functions. In addition to the this trend, each type and model of personal computers often has unique arrangement and configuration by placing these peripherals in different locations. In order to satisfy the very complicate requirements for providing power to all the peripherals, a power supply system including the power cable and the interface connectors are required to be custom designed to uniquely meet the specifications of each model of computer system design.

FIG. 1 shows a prior art power supply system 10 which includes several output (O/P) cable groups, i.e., cable groups 15-1, 15-2, 15-3, and 15-4 for connecting to the CPU and various different peripherals such as hard-disk derive (HDD), floppy disk drive (FDD), compact disk drive (CDD), modem-facsimile board and monitor. The power supply system also has a power cable 20 for connecting to an external power source connector 25. The external power source connector is typically installed at the back-panel of a personal computer for connecting to an external source via a power line (not shown). Depending on the internal space arrangement, the power supply system 10 for a personal computer can be located at different positions in a personal computer system. The length of the power cable 20 and those of the O/P cable groups 15-1, 15-2, 15-3, and 15-4 are all different. For this reason, the general practice in manufacturing the power supply system for a personal computer is to custom design and then 'tailor-make' those cables and group them in accordance with the specifications of each purchase order.

Special notice should also be taken with respect to the welding or soldering of each individual O/P cable to a particular connection point on the printed circuit board (PCB) of the power supply system. Due to this individual cable connection configuration, the conventional manufacture process must handle the length of each O/P cable on an individual basis as each O/P cable may have different length when a particular O/P cable is pre-designated to be welded to a specific connection point on the PCB and to be included in a specific cable group to provide a specific DC voltage for a predetermined peripheral sub-system. Due to this point-to-point design concept, a power supply system, including the design of each O/P cable such as the connection point on the PCB in the power supply system and length of each O/P cable, are specifically designed and manufactured according to customer specifications for each brand-model.

One example of these power supply systems is ASTEC's power supply Model AS145-3420 which has output cable connection and output cable groups as that shown in FIGS. 2A and 2B for an IBM personal computer. FIG. 2A is a side view of a power supply wherein a plurality of output cables from the AS145-3420 power supply is connected directly from the power supply unit near the top of the panel along a surface in the A-A' direction. The output-cable connection 40 of this power supply AS145-3420 unit is the same as that shown in FIG. 1. FIG. 2B shows the detail groupings of these output cables, i.e., cable groups 45-1 to 45-6. Since the groupings of these output cables 45-1 to 45-6 may be different for different model of computers, this Model AS145-3420 power supply shows a typical design approach generally used. It should be noted that in FIG. 2B, each O/P cable is to provide a specific output DC voltage to a particular pin as marked out for each pin. The DC voltages for these pins can be a ground voltage, −5 volts, +5 volts, −12 volts, and +12 volts as shown. A different color is used for each O/P cable for easy recognition of different DC voltage assigned to that O/P cable. Because ASTEC is one of the major power supply companies for the personal computers worldwide while IBM has continuously dominated the PC market share, the design method as shown for ASTEC145-3420 demonstrates the level of ordinary skill in the art of power supply design in the particular field pertinent to the personal computer systems.

Therefore, there is still a need for a new system configuration and design method in the art of power-supply design and manufacture in order to resolve these difficulties and limitations. Specifically, this new system configuration and design approach must be able to provide a more flexible scheme to satisfy different customer's requirements in providing power to many subsystems in a personal computer which may be arranged in many different ways according to the packaging layout, the level of integration, the performance level, the intended computer functions and a wide variety of other design considerations that the computer system designer may take into account.

SUMMARY OF THE PRESENT INVENTION

It is therefore an object of the present invention to provide a power supply system to include a standardized printed circuit board with modularized and integrated cable interface configuration and design method to overcome the aforementioned difficulties encountered in the prior art.

Specifically, it is an object of the present invention to provide a power supply system to include a standardized printed circuit board with cable interface configuration and design method which allow more flexibility in satisfying customer's requirements in providing power to every subsystem in a personal computer that may be differently configured.

Another object of the present invention is to provide a power supply system to include a standardized printed circuit board (PCB) with cable interface configuration and design method which allow more flexibility such that the cost of custom design and manufacture for each product model may be reduced.

Another object of the present invention is to provide a power supply system to include a standardized printed circuit board (PCB) with cable interface configuration and design method which allow more flexibility in arranging the length and connection points of the O/P cable on the PCB such that the cost of inventory and shipment may be reduced.

Another object of the present invention is to provide a power supply system to include a standardized printed circuit board with cable interface configuration and design method which allow more flexibility in arranging the length and connection points of the O/P cable on the PCB in order to shorten the manufacture's response time to the customer's requirements for providing the power supply systems to different models of personal computers.

Briefly, in a preferred embodiment, the present invention comprises a power supply system with modularized and integrated cable interface configuration for providing power from an external power source to a plurality of subsystems in a personal computer. The power supply system includes a power cable for connecting the power supply system to the external power source. The power supply system further includes an output (O/P) cable having a first end and second end, the O/P cable including a plurality of cable groups wherein each of the cable groups including a subsystem plug module on the first end for connecting to a corresponding PC subsystems. The power supply system further includes a printed circuit board which includes an integrated PC receptive module for providing an interface with the O/P cable. The O/P cable further including an integrated O/P cable plug module on the second end for plugging the O/P cable into the integrated receptive module, wherein the integrated O/P plug module being in electric connection to each of the cable groups. The O/P cable of the power supply system may be conveniently removed and separately designed and manufactured for connection to different types of the personal computers. In another preferred embodiment, the integrated PC receptive module is a standardized module suitable for providing power to many different types for the PC subsystems by utilizing different designs and combinations of the O/P cable groups.

These and other objects and advantages of the present invention will no doubt become obvious to those of ordinary skill in the art after having read the following detailed description of the preferred embodiment which is illustrated in the various drawing figures.

BRIEF DESCRIPTION OF THE DRAWINGS

FIGS. 4A and 4B are partial perspective views of a personal computer power supply and the external power receptive module installed on the back panel of the personal computer power supply;

FIG. 4C shows a circuit diagram of the external power receptive module of the present invention;

DETAILED DESCRIPTION OF THE PREFERRED EMBODIMENT

Figure 1:
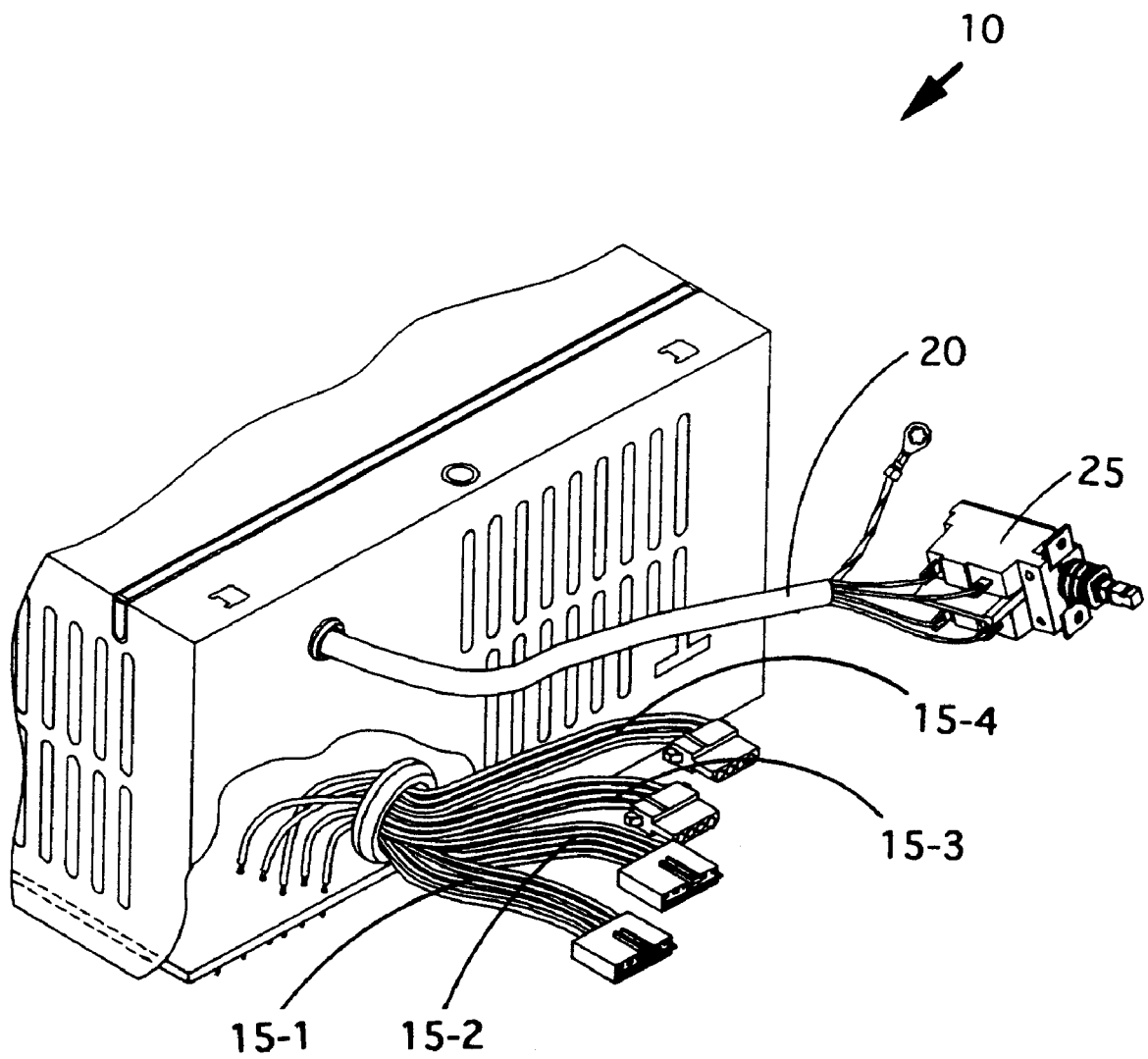
FIG. 1 is a partial perspective view of a prior art power supply system.
Figure 2A:
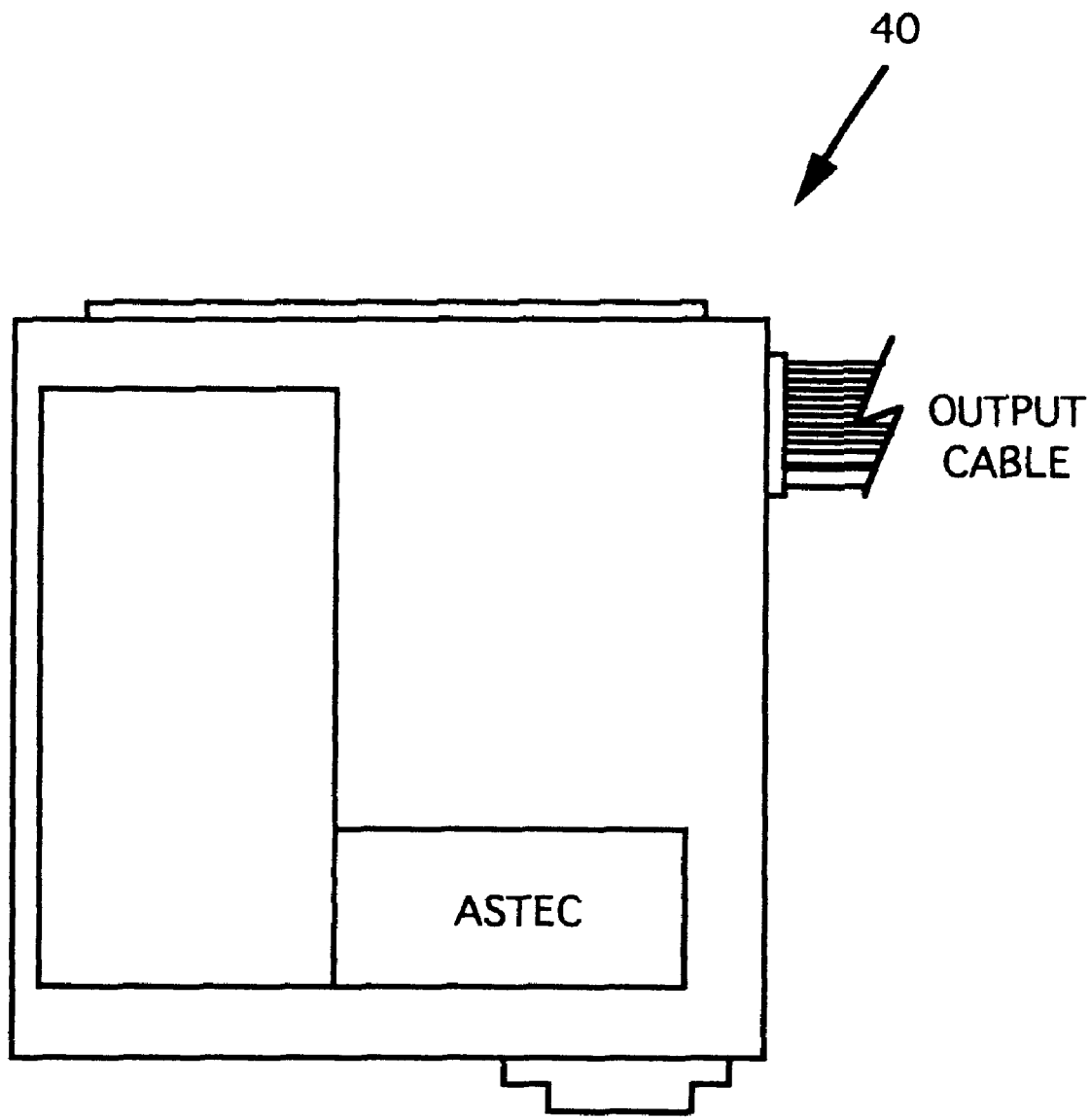
FIG. 2A is a side view of another prior art power supply system showing the connection of the output cables to the power supply system.
Figure 2B:
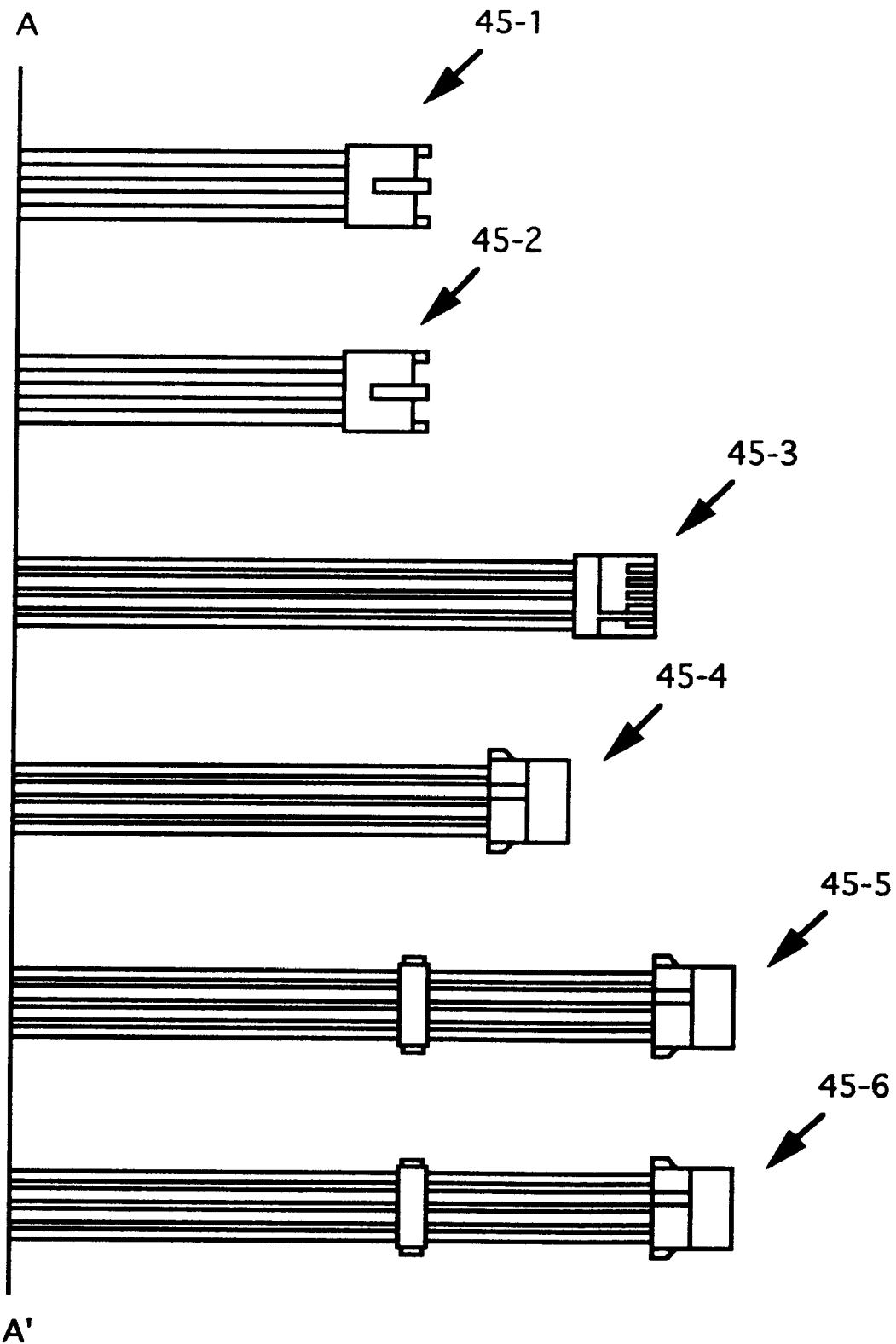
FIG. 2B is a cable diagram showing the output cable groups of the power supply system of FIG. 2A.
Figure 3A:
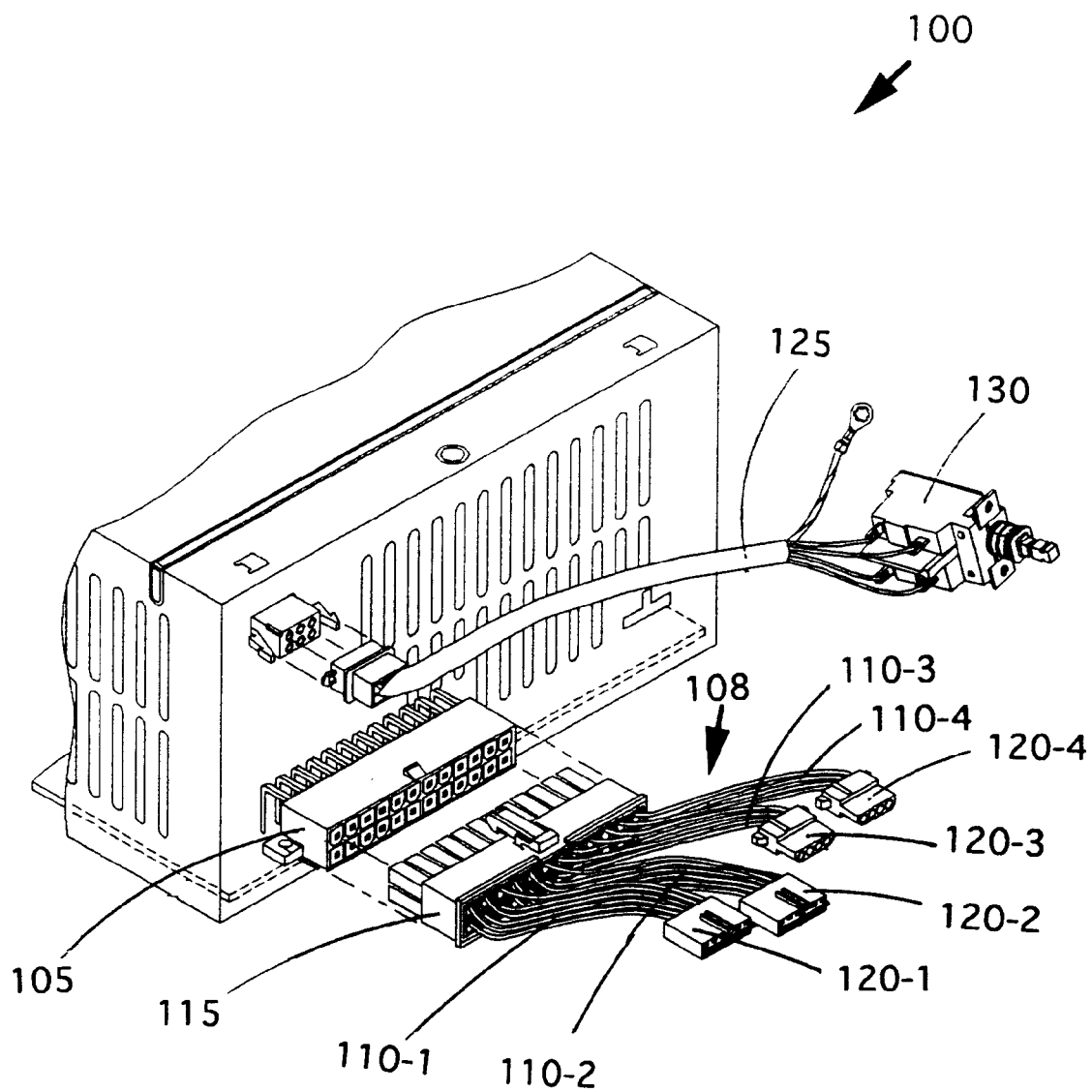
FIGS. 3A and 3B are respectively a partial perspective view and a functional diagram for showing the connection a power supply system in a personal computer according to the present invention.
Figure 3B:
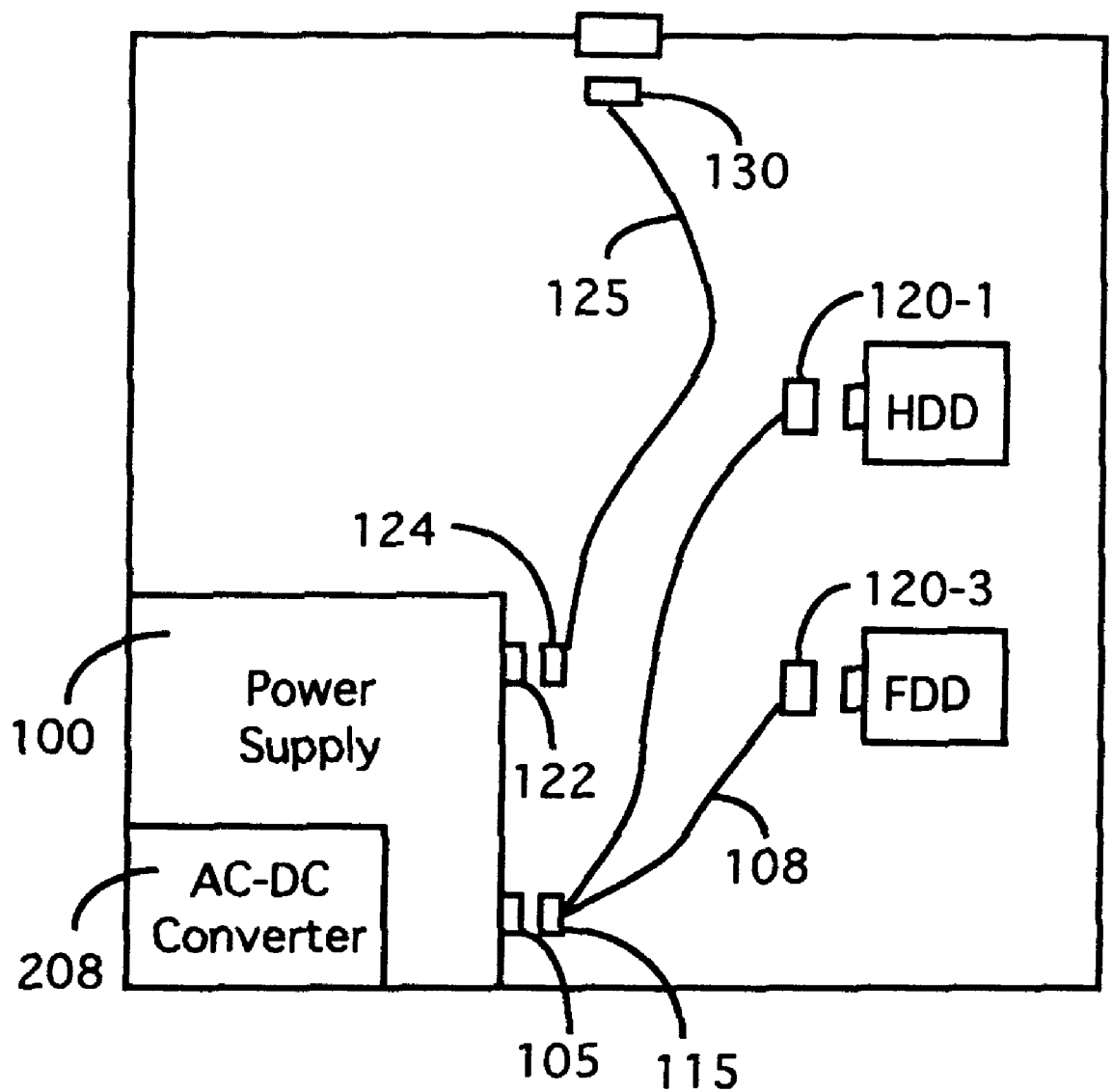

FIG. 3A shows a perspective view of a power supply system 100 of the present invention. The power supply system 100 includes an integrated personal-computer (PC) receptive module 105 which is connected to a plurality of standard DC output terminal on a printed circuit board (PCB) as that shown in FIG. 3. The printed circuit board includes a AC to DC conversion circuit to convert an AC input to several standard DC output voltages. The power supply system 100 also includes an O/P cable 110 which includes a plurality of power connecting lines grouped into several subsystem-cable groups, e.g., cable groups 110-1 to 110-4 wherein the power connecting lines in each subsystem cable group have two ends. In the first end, these power connecting lines in each subsystem groups are all combined for connecting to an integrated O/P cable plugging module 115. The integrated O/P cable plugging module 115 is designed for plugging into and securely attached to the integrated PC receptive module 105. On the second end, the power connecting lines in each subsystem cable group are integrated and connected to a subsystem power plug module, e.g., power plug modules 120-1 to 120-4. The subsystem power plug module, i.e., modules 120-1 to 120-4, are then employed for plugging into a corresponding subsystem (not shown), such as a hard disk drive, a monitor, etc. for providing the required power for system operation.

The power supply system 100 further includes a power cable receptive module 122 and a power cable 125. The power cable 125 has two ends, on the first end, it has a power cable plugging module 124 for plugging into the receptive module 122. On the second end, the power cable 125 has an external power receptive module 130, typically affixed on the back panel of a personal computer for connecting to an external power source (not shown). FIG. 4A is a partial perspective view from the back panel of a personal computer 200. The external power interface module 208 as shown in FIG. 4B to be installed onto the back panel 205. For the purpose of more flexibly meeting customer's different specification, the external power receptive module 130 is designed to be a three-function module which provides a male plug unit 210-1, a female plug unit 210-2 and a 110/220-volt switch unit 210-3 allowing the interface module 208 to be connected to ether a 110 volts or a 220 volts voltage source. FIG. 4C shows the circuit diagram of the interface module 208 wherein the common voltage terminals, a positive, a negative and a ground terminal for the male unit 210-1 and the female unit 210-2 are connected together as one common terminal. By using the three-function module shown in FIGS. 4B and 4C for the external power interface module 208, savings in manufacturing cost and time are achieved because of the less time and materials are required in making this integrated unit than to design and manufacture two separate plug modules. Additionally, this three-function module 208 used in a power supply system 100 provides flexibility for application to different types of personal computer designs.

Referring to FIG. 3 again, the power supply system 100 according to the present invention includes the integrated O/P PC receptive module 105 coupled with the integrated O/P cable plugging module 115, and the power cable receptive module 122 coupled with the power cable plugging module 124. This system configuration allows the power system designer to more flexibly respond to customer requirements. The power supply module can be designed and manufactured in advance with a standard integrated PC receptive module 105 and standard power cable receptive module 122. The integrated PC receptive module can be designed with a standard such that the metal connecting pins contained therein are arranged to provide different level of voltages as often required in supplying power to different subsystems and peripherals of a personal computer. Depending on customer's specification for the power supply to be used with different model of personal computers, these requirements are then satisfied by specifically designing and manufacturing the O/P cable 110 and the power cable 125. The O/P cable is designed with different subsystem groups having different lengths and combination of connecting lines and the power cable 125 are designed with different length as each model of personal computers may require.

In summary the present invention discloses a personal computer (PC) power supply system 100 for providing power from an external power source (not shown) to a plurality of PC subsystems (not shown). The power supply system 100 comprises a power cable 125 for connecting the power supply system to the external power source. The power supply system further includes an output (O/P) cable 108 having a first end and second end, the O/P cable including a plurality of cable groups, e.g., groups 110-1, 110-2, 110-3, and 110-4, wherein each of the cable groups 110-1 to 110-4 including a subsystem plug module, e.g., 120-1 to 120-4 on the first end for connecting to a corresponding PC subsystems. The power supply system further includes an integrated PC receptive module 105 for providing an interface with the O/P cable 108. The O/P cable 108 further includes an integrated O/P cable plug module 115 on the second end for plugging the O/P cable 108 into the integrated receptive module 105, wherein the integrated O/P plug module 115 being in electric connection to each of the cable groups, e.g., 110-1 to 110-4. The O/P cable 108 of the power supply system 100 may be conveniently removed and separately designed and manufactured for connection to different types of the personal computers. In another preferred embodiment, the integrated PC receptive module 105 is a standardized module with standard pin configurations suitable for providing power to many different types for the PC subsystems by utilizing different designs and combinations of the O/P cable groups. In another preferred embodiment, the integrated PC receptive module 105 is a female type module and the integrated O/P cable plugging module 115 is a corresponding male type module. In another preferred embodiment, the PC power supply system 100 further includes a power cable receptive module 122 and the power cable 125 further includes a power cable plugging module 124 for plugging the power cable 125 into the power cable receptive module 122 wherein the power cable 125 may be conveniently removed from the power supply system 100 and be separately designed and manufactured. In a preferred embodiment, the power cable receptive module 122 is a female type module and the power cable plugging module 124 is a corresponding male type module. In another preferred embodiment as shown in FIG. 4B, the PC power supply system 100 further comprises a three-function module 208 including a male plug unit 210-1, a female plug unit 210-2, and a 110-volt/220-volt switch unit 210-3.

Figure 5:
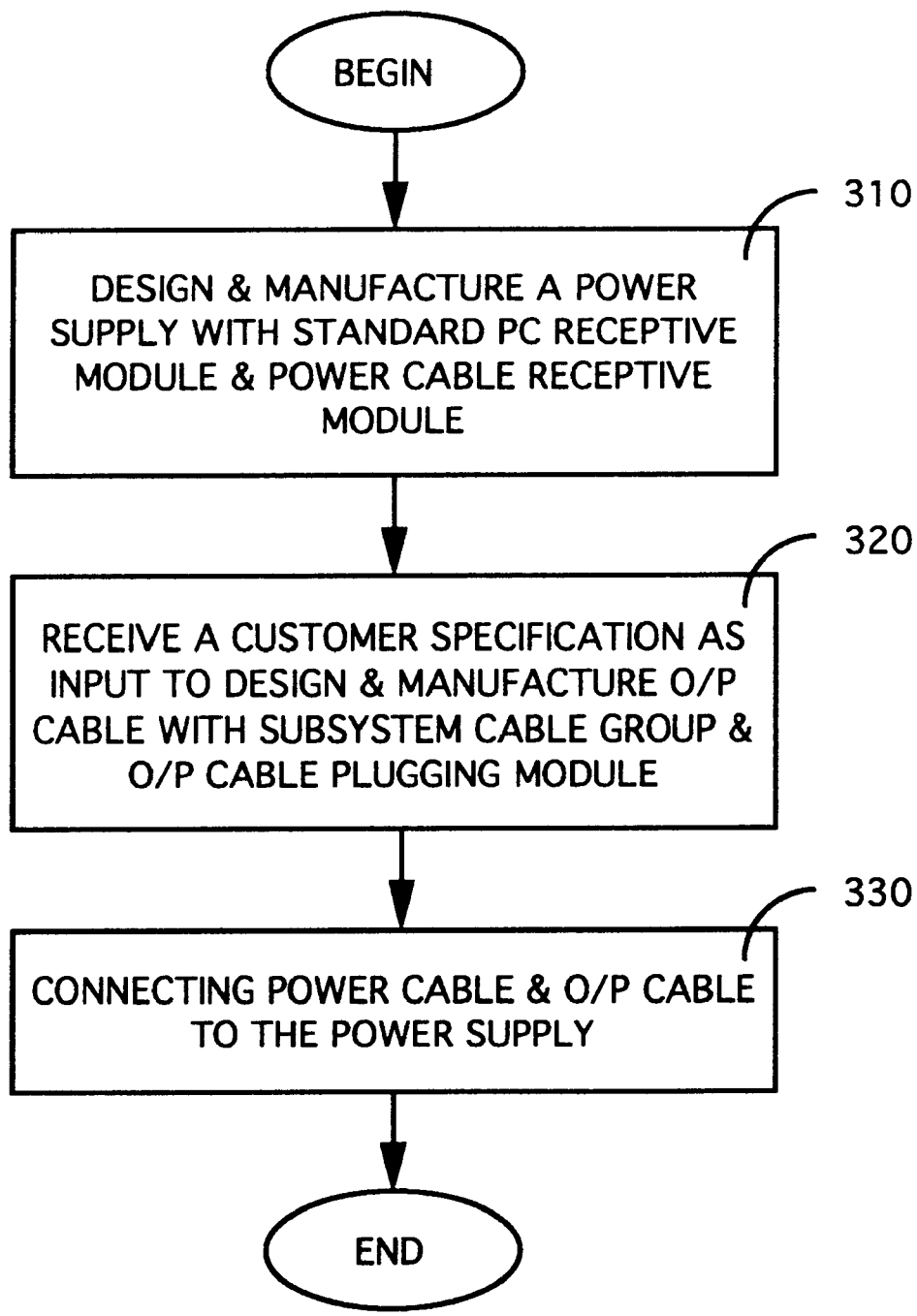
FIG. 5 is a flow chart showing the design process for designing the power supply system for customer's specifications according to the principles of the present invention.

Referring to FIG. 5 where a flow chart is used to show the design and manufacture processes used for a power supply system such as the system 100 for a personal computer. The power supply system 100 is designed and manufactured with standard PC receptive module 105 and the power cable receptive module 122 with standard size and pin connections (step 310). A customer specification is then received as input data for designing the O/P cable 110 with the integrated O/P cable plugging module 105, the subsystem cable groups 110-1, 110-2, etc. each with a corresponding subsystem power plug module 120-1, 120-2, etc, and the the power cable 125 (step 320). Each of these cables may have different lengths and the O/P subgroup cable groups 110-1, 110-2, etc. may have various combinations of connecting lines depending on the specification provided by the requirements for incorporation into a personal computer system. The design and manufacturing of the power supply system 100 for the personal computer are completed after testing the power supply system 100 by connecting the power cable 125 and the O/P cable 108 via the integrated modules 105, 115, 122 and 124 as a completed and integrated power supply system 100 (step 330).

Figure 6A:
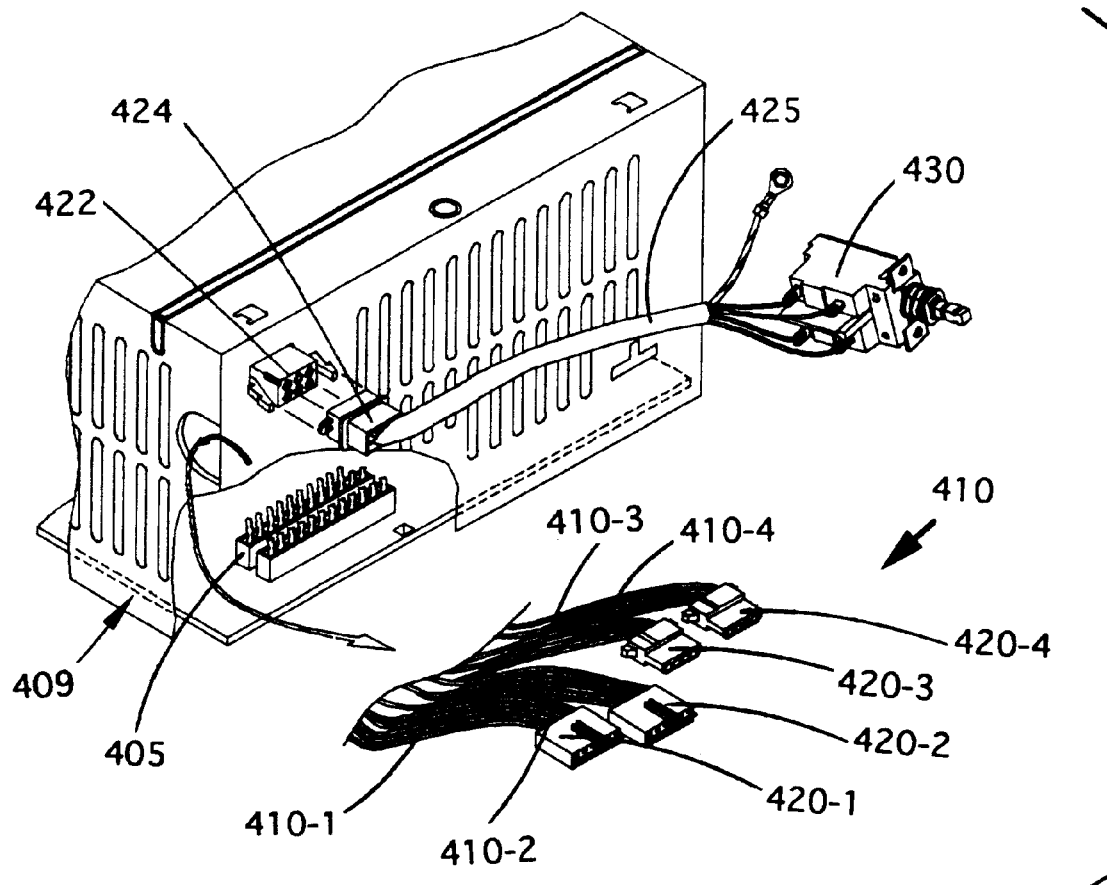
FIG. 6A is a partial perspective view of a power supply system according to another preferred embodiment of the present invention.
Figure 6B:
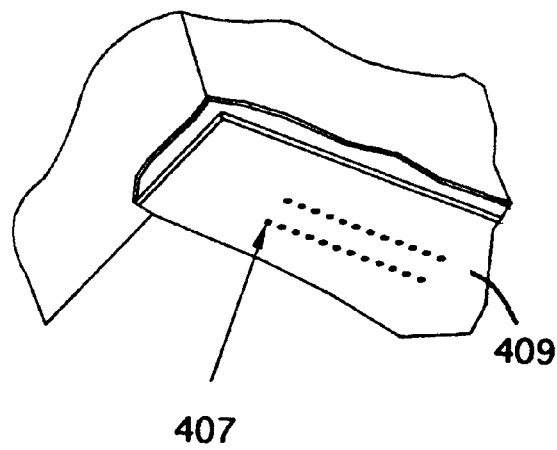
FIGS. 6B and 6C are partial perspective views of the soldering vias and the interface of the integrated PC receptive module to the output cables for the power supply system of FIG. 6A.
Figure 6C:
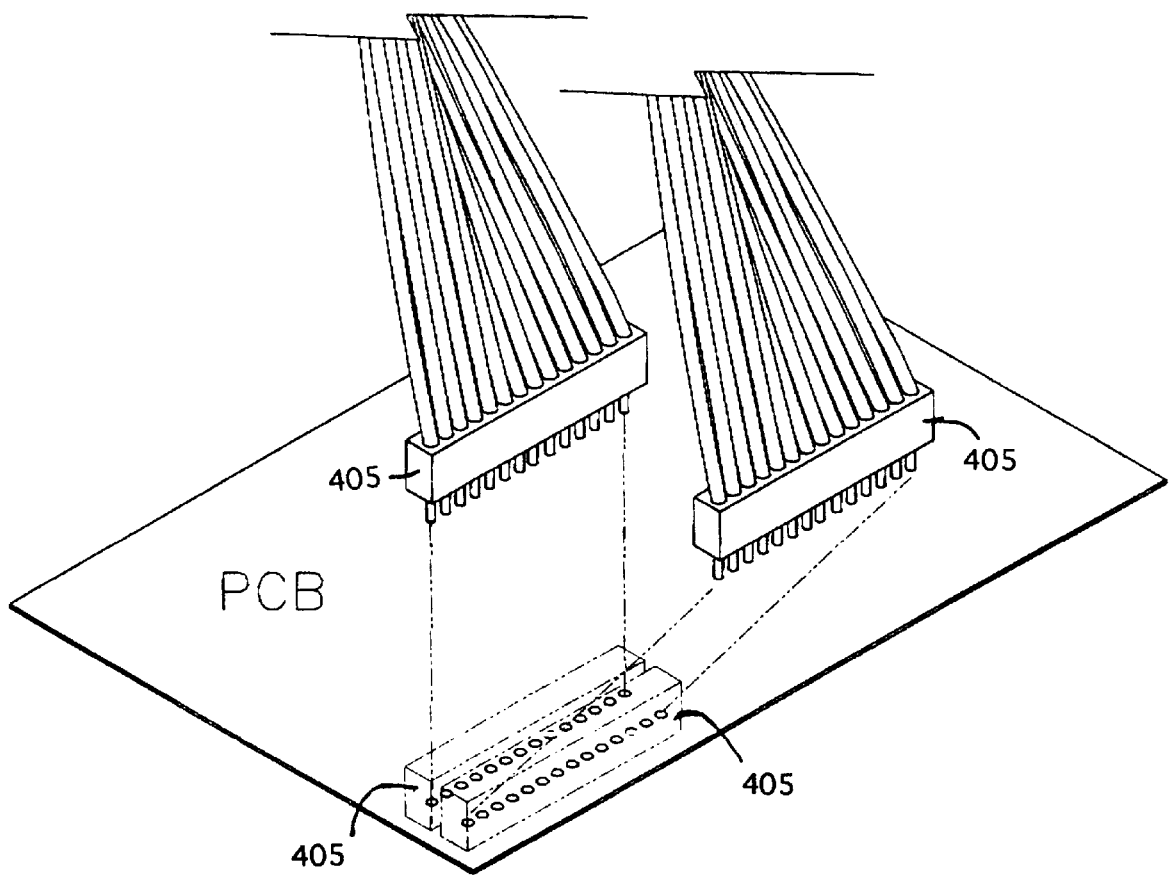

FIG. 6A shows a partial perspective view of a power supply system 400 of an alternate preferred embodiment of the present invention. The power supply system 400 includes an integrated personal-computer (PC) receptive module 405 formed on a printed circuit board (PCB) 409. The power supply system 400 also includes an O/P cable 410 which includes a plurality of power connecting lines grouped into several subsystem-cable groups, e.g., cable groups 410-1 to 410-4 wherein the power connecting lines in each subsystem cable group have two ends. In the first end, for each of these power connecting lines, the integrated PC receptive module 405 has a corresponding soldering via 407 (please refer to FIGS. 6B and 6C). Each of these power connecting lines in each subsystem groups are designed pass through a corresponding soldering via 407 from the top of the printed circuit board (PCB) 409 to be soldered to the circuits on the PCB 409. On the second end, the power connecting lines in each subsystem cable group are integrated and connected to a subsystem power plug module, e.g., power plug modules 420-1 to 420-4. The subsystem power plug module, i.e., modules 420-1 to 420-4, are then employed for plugging into a corresponding subsystem (not shown), such as a hard disk drive, a monitor, etc. for providing the required power for system operation.

The power supply system 400 further includes a power cable receptive module 422, a power cable 425, and an external power receptive module 430. The power cable 425 is connected to the power supply system 400 through the power receptive module 422 and the power cable plugging module 424 at one end, which is connected to the external power source (not shown) on the other end in same manner as that shown and described for FIGS. 3 and 4. The details of the power cable connection are therefore not further described here.

Referring to FIGS. 6A to 6C again, the power supply system 400 according to the present invention includes the integrated O/P PC receptive module 405 wherein a soldering via 407 is provided for each power line for soldering on to the PCB. Also, the power cable receptive module 422 coupled with the power cable plugging module 424 are provided for connecting the power supply 400 to the external power source (not shown). This system configuration allows the power system designer to more flexibly respond to customer requirements. The power supply module can be designed and manufactured in advance with a standard power cable receptive module 422 and a standard integrated PC receptive module 405. The integrated PC receptive module can be designed with standard pattern for soldering vias 407 ready to provide electric connecting of the power lines to the standard circuits on the PCB 409 which are arranged to provide different level of voltages as often required in supplying power to different subsystems and peripherals of a personal computer. Depending on customer's specification for the power supply to be used with different model of personal computers, these requirements are then satisfied by specifically designing and manufacturing the O/P cable 410 and the power cable 425. The O/P cable is designed with different subsystem groups 410-1, 410-2, . . . 410-4, etc. having different lengths and combination of connecting lines which are connected to the integrated subsystem power plugging modules 420-1, 420-2, . . . 420-4, etc. for plugging into different subsystems. The power cable 125 are designed with different length as each model of personal computers may require. The manufacture of the power supply 400 is completed by passing each of the power connecting lines through a corresponding soldering via 407 and then soldering the connecting lines to the PCB 409.

The present invention thus discloses a personal computer (PC) power supply system 400 for providing power from an external power source to a plurality of PC subsystems. The power supply system 400 includes a power cable 425 for connecting the power supply system 400 to the external power source. The power supply system 400 further includes an output (O/P) cable 410 having a first end and second end. The O/P cable 410 including a plurality of cable groups 410-1, 410-2, . . . ,410-4, etc., wherein each of the cable groups including a subsystem plug module 420-1, 420-2, 420-3, . . . , etc., on the first end for connecting to a corresponding PC subsystem. The power supply system 400 further includes an integrated PC receptive module 405 including a plurality of connecting means 407 for providing an interface with the O/P cable 405 for establishing an electric connection with the O/P cable. The O/P cable 405 of the power supply system 400 may be independently and separately designed and manufactured for connection to different types of the personal computers. In one of the preferred embodiment, the plurality of connecting means 407 of the integrated PC receptive module 405 are standardized suitable for providing power to many different types for the PC subsystems by utilizing different designs and combinations of the O/P cable groups 410, 410-2, 410-3, . . . , etc. In yet another preferred embodiment, the plurality of connecting means 407 of the integrated PC receptive module 405 are standardized patterns of soldering vias 407 for soldering the O/P cable 405 to a printed circuit board (PCB) 409 included in the PC power supply system 400.

The present invention thus discloses a method for designing and manufacturing a personal computer (PC) power supply system 400 for providing power to a plurality of PC subsystems from an external power source. The method includes the steps of (a) designing and manufacturing a power supply system 400 with an integrated PC receptive module 405 providing a plurality of standard connection means, e.g., the soldering vias 407 therein; (b) receiving a personal computer system specification defining a plurality of PC subsystems and corresponding subsystem power requirements; and (c) designing and manufacturing an output (O/P) cable 410 wherein (i) the O/P cable 410 including a plurality of O/P cable groups 410-1, 410-2, . . . , 410-4, etc., according to the PC system specification and the subsystem power requirements, and (ii) each of the power connecting lines included in the O/P cable is ready to be connected to a corresponding connecting means, e.g., to be soldered to a corresponding soldering via 407 to be electrically connected to a PCB 409 of the power supply system 400.

In another preferred method for designing and manufacturing the PC power supply system the step (a) may further a step of designing and manufacturing the OP cable receptive module with standardized pattern of the connecting means, e.g., a standard pattern of the soldering vias suitable for providing power to many different types for the PC subsystems by utilizing different designs and combinations of the O/P cable groups. In another preferred method for designing and manufacturing the PC power supply system the step (a) may further include a step of designing and manufacturing the power supply system with a power cable receptive module; and the step (c) may further include a step of designing and manufacturing a power cable with a power cable plugging module for plugging the power cable into the power cable receptive module.

The above design and manufacture processes provide several advantages. First, it decrease the design and manufacture cost by standardize the basic unit of the power supply system. Cost savings can be achieved without requiring to re-design the major part of the power supply system. Secondly, by standardizing the design and manufacturing process, better and more stable quality control can be consistently performed with less variations between different product lines to be tested and controlled. Thirdly, by dividing the entire process into two major stages, i.e., the basic standard basic unit and the customized cable, more flexibility is provided for the power supply designer and manufacturer to better respond to different customer's requirements. this is because of the fact that the design and manufacture of the cables are generally easier and can be completed in shorter time. The production bottleneck which often encountered in the conventional process in requiring customized power supply system for in order to be compatible with many different kinds of computer configurations is therefore resolved by the present invention.

The present invention discloses a new and non-obvious system configuration and design method to provide a modularized and integrated cable interface for the personal computer power supply system. The disclosed modularized and integrated cable interface may appear to be well known in other fields of design and manufacture of the electronic products, it is nevertheless new and non-obvious in the field of the power supply for personal computer for several reasons explained below.

First of all, the modularized and integrated cable interfaces are commonly employed in design and manufacture of many electronic products for the major reason of operational flexibility, i.e., for the ease of installation, connecting and disconnecting among several subsystems or operational devices. Such interface configurations are intended for the benefits of the end users. In contrast, the modularized and integrated interface configuration as disclosed in this invention are employed as a processing steps for allowing flexibility in design and manufacture. The target groups between those of other electronic products with the integrated and modularized cable interface and of this invention are entirely different and thus have different purposes and requirements. The techniques which may be well known and obvious for one one target group, e.g., the end user, may not be so for a different group, e.g., the power supply system designers, because the intended use and potential benefits are entirely different.

Secondly, the trend of computer industry is moving toward more complex system as the CPU and the expanding storage capacity are capable of supporting more peripherals to perform more functions. The design of the power supply system is required to catch up with the latest development. The interest and the requirements of the computer manufacturers, i.e., the purchaser and the 'end-users' of the power supply system, is driving the power supply system to satisfy more different kinds of system configurations. The trend and the design requirements are in contradiction to integration and standardization. A 'blind spot' is thus formed in the art of power supply system design to implement a modularized and integrated cable interface as that are available for many other electronic products.

Thirdly, the design and manufacture of the power supply system are 'driven' instead of 'leading' by the requirements of the computer system design. The art of system design of the power supply is often in a 'responsive' and 'reaction' mode since the technology is typically more conventional. Without the demand and requirements from the purchaser and computer system designers, the concept of a modularized and integrated cable interface system, as disclosed in the present invention, is generally not considered even though there are similar configurations implemented in many other electronic products.

Figure 7A:
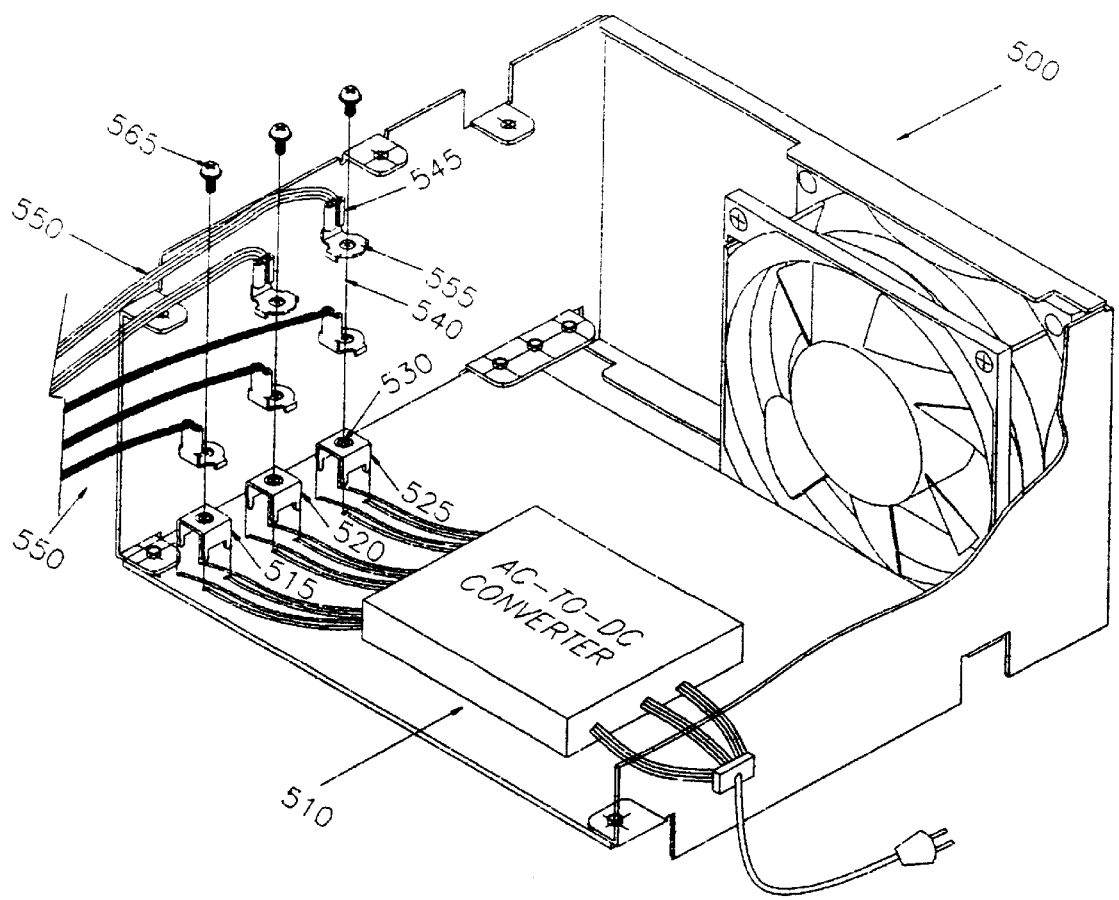
FIGS. 7A and 7C are respectively a partial perspective view of a power supply system and an alternate standard DC output terminals for mounting onto standard power output terminals on a PCB.
Figure 7B:
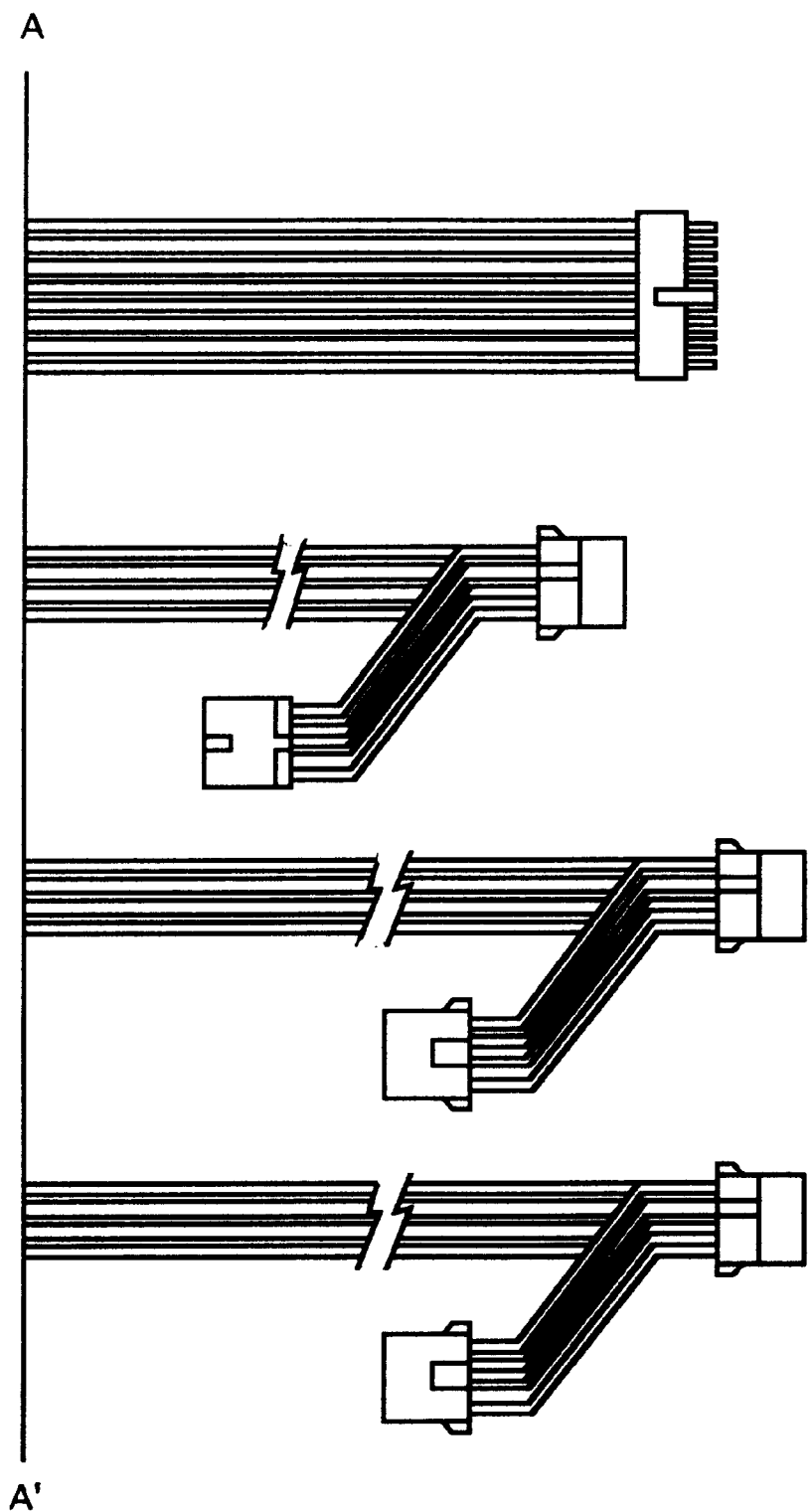
FIG. 7B is a cable diagram showing a set of output cables with a first end grouped into interface modules for connecting to a plurality of peripherals while the other end A-A' are ready to be grouped for connecting to several standard power output terminals of FIG. 7A.

In FIGS. 7A and 7B, an alternate preferred embodiment is disclosed wherein a power supply system 500 for a personal computer employed to provide power to a plurality of PC subsystems from an external power source (not shown). The power supply system 500 includes an AC to DC conversion circuit, disposed on a printed circuit board (PCB) 510 of the power supply system, to convert an AC voltage from the external power source to several standard DC voltages. The power supply system 500 further includes a standard DC output terminal for each of the several standard DC voltages, disposed on the printed circuit board 510, for providing one of the standard DC voltages therefrom, comprising at least a three-volt terminal 515, a five-volt terminal 520 and a twelve-volt terminal 525, wherein each of these standard DC output terminal includes a threaded locking hole 530 disposed thereon. The power supply system 500 further includes a cable ring terminal 540 includes a cable ring 545 provided for collecting and bounding a group of output cables 550 therein to connect to one of the standard DC output terminals 525, the cable ring terminal 540 further includes a locking ring 555 attached to the cable ring 545 by an upwardly extended vertical neck 560 wherein the locking ring 555 is provided to engage to the threaded locking hole 530 disposed on the standard DC output terminal 525 for securely screwed thereon by a locking screw 565 whereby the group of output cables 550 bounded in the cable ring 545 can be securely connected to one of the standard DC output terminals 525. The cable ring terminal 540 further includes a horizontal neck 570 connected to a lower end of the vertical neck 560 and to the locking ring 555 whereby the locking ring 555 extends laterally away from the cable ring 545 such that the locking screw 565 can be conveniently screwed onto the threaded locking hole 530 through the locking ring 555.

Figure 7C:
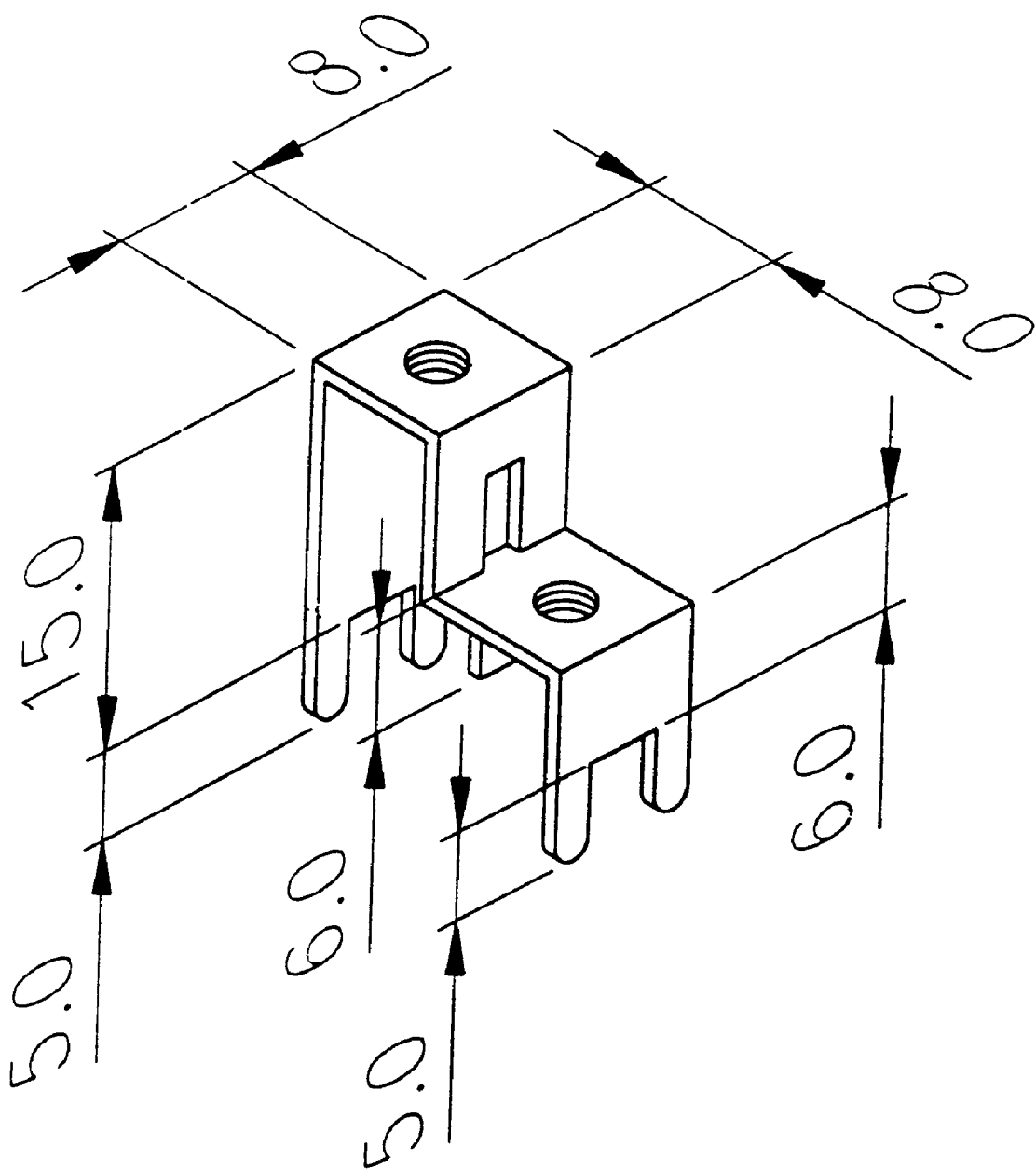

Please refer to FIG. 7C where an alternate embodiment of a standard DC output terminal 515' is shown. This standard DC output terminal 515' includes two connected standard output terminals 515'-1 and 515'-2 each includes a locking hole 530'-1 and 530-2 respectively for locking to two different locking rings (not shown). A similar standard DC output terminal for connecting to multiple groups of output cables is also shown in FIG. 8B below.

Figure 8A:
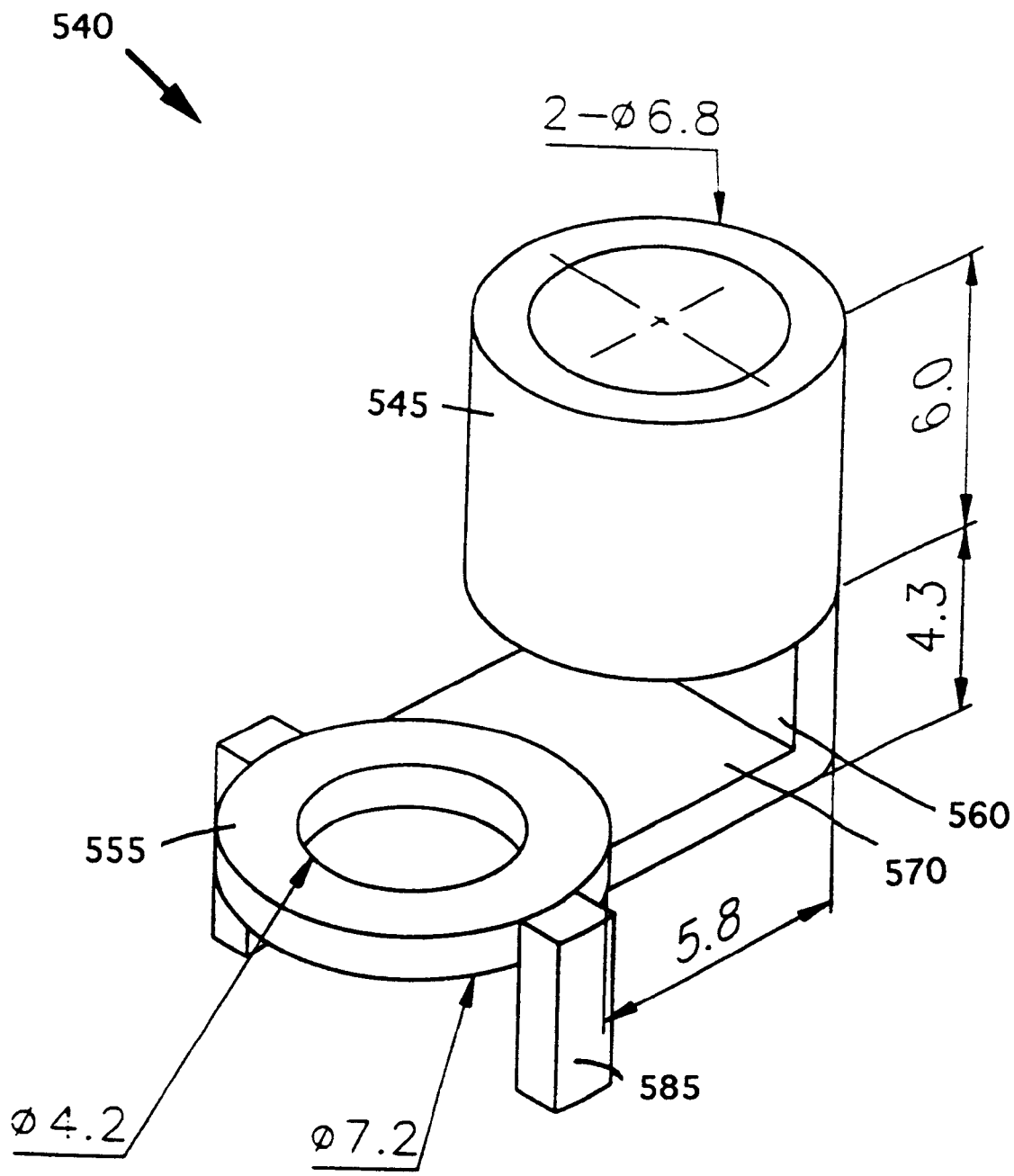
FIG. 8A is a perspective view of a ring terminal for securely locking a plurality of output cables to a standard power output terminal.
Figure 8B:
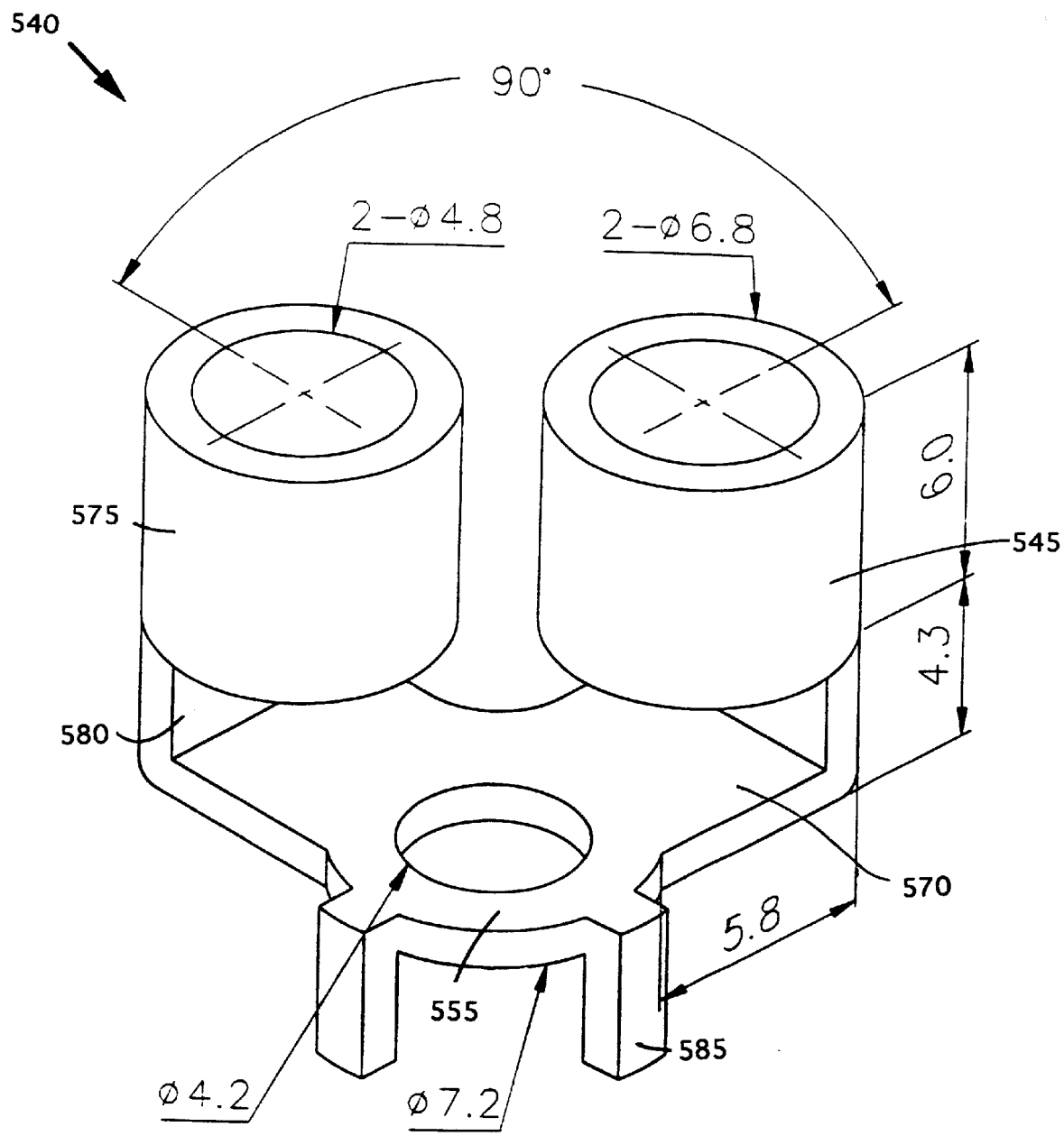
FIG. 8B is a perspective view of another ring terminal for securely locking a plurality of output cables separated into two groups for connecting to a standard power output terminal.

In FIG. 8B, the cable ring terminal 540 further includes a second cable ring 575 and a second vertical neck 580, connected between the second cable ring 575 and the horizontal neck 570, for collecting and attaching a second set of power cables therein whereby the standard DC output terminal 525 can be conveniently connected to the power cables bounded by the cable rings 545 and 575. Referring to FIGS. 8A and 8B, the locking ring 555 further includes a pair of legs 585 for engaging the standard DC output terminal 545 for preventing the cable ring terminal 545 from rotating against the standard DC output terminal 525 in applying the locking screw 565 to securely attach the locking ring 555 onto the threaded locking hole 530 on the standard DC output terminal 525. Furthermore, the cable rings 545 and 575 further includes an insulating protective layer covering thereon for insulating and protecting the cable ring and the power cables to be collected and bounded therein.

According to FIGS. 7A to 7B, a printed circuit board (PCB) 510 for a power supply system 500 employed to provide power to a plurality of subsystems in a personal computer (PC) from an external power source is disclosed in this invention. The PCB 510 includes an AC to DC conversion circuit, disposed on the PCB to convert an AC voltage from the external power source to several standard subsystem DC voltages for the PC. The PCB further includes a plurality of standard DC output terminals 515, 520, and 525 each corresponding to one of the several standard subsystem DC voltages for connecting to a set of output cables to provide one of the standard subsystem DC voltages therefrom to each of the subsystems in the PC. In one of the preferred embodiments, the plurality of standard DC output terminals 525 comprising at least a three-volt standard terminal, a five-volt standard terminal and a twelve-volt standard terminal corresponding to one of the several standard subsystem DC voltages. Also, each of the plurality of standard DC output terminals further includes a cable-group attaching means 525 for securely connecting to the set of output cables. Each of the cable-group attaching means 515, 520, and 525 is a threaded locking holes 530 disposed on the standard DC output terminal for securely locking to the set of output cables by using a threaded screw 560.

In another embodiment as that shown in FIG. 7, a power supply system (500) is disclosed that includes an AC to DC conversion circuit and terminals (515, 520, 525) for applying different DC voltages to cables that lead to the subsystems in the computer.

According to FIGS. 8A and 8B, a cable ring terminal 540 provided for a power supply system employed to provide power to a plurality of subsystems in a personal computer (PC) from an external power source is disclosed in this invention. The cable ring terminal includes a cable ring 545 provided for collecting and attaching a group of output cables 550 therein. The cable ring terminal 540 further includes a locking ring 555 attached to the cable ring 545 by an upwardly extended vertical neck 560 wherein the locking ring 555 is provided to engage to a threaded locking hole 530 disposed on a standard DC output terminal 525 on the power supply system for securely screwed thereon by a locking screw 565. The cable terminal 545 further includes a horizontal neck 570 connected to a lower end of the vertical neck 560 and to the locking ring 555 whereby the locking ring 555 extends laterally away from the cable ring 545 such that the locking screw 565 can be conveniently screwed onto the threaded locking hole 530 through the locking ring 555. In FIG. 8B, the cable terminal 545 further includes a second cable ring 575 and a second vertical neck 580, connected between the second cable ring 575 and the horizontal neck 570, for collecting and bounding a second set of power cables therein whereby the standard DC output terminal 525 can be conveniently connected to the power cables 550 bounded by the cable rings 545 and 575. The locking ring 555 further includes a pair of legs 585 for engaging the standard DC output terminal 525 for preventing the cable ring terminal 540 from rotating against the standard DC output terminal 525 when engaged thereon. The cable rings 545 and 575 further includes an insulating protective layer covering thereon for insulating and protecting the cable rings 545 and 575 and the power cables 550 to be collected and bounded therein.

The present invention thus discloses a method for providing a printed circuit board (PCB) for a power supply system to be flexibly incorporated into personal computer of various models and brands. The manufacture process is to provide several standard DC output terminals at standard DC voltages, e.g., 3-volt, 5-volt, 12-volts, etc. The output cables can be flexibly grouped and connected to these standard DC output terminals by employing the attachment mechanisms as disclosed in this invention.

Although the present invention has been described in terms of the presently preferred embodiment, it is to be understood that such disclosure is not to be interpreted as limiting. Various alternations and modifications will no doubt become apparent to those skilled in the art after reading the above disclosure. Accordingly, it is intended that the appended claims be interpreted as covering all alternations and modifications as fall within the true spirit and scope of the invention.

What is claimed is:

1. A power supply system for a personal computer employed to provide power to a plurality of PC subsystems from an external power source comprising:

an AC to DC conversion circuit, disposed on a printed circuit board (PCB) of said power supply system, to convert an AC voltage from said external power source to several standard DC voltages;

a standard DC output terminal for each of said several standard DC voltages, disposed on said printed circuit board, for providing one of said standard DC voltages therefrom, comprising at least a three-volt terminal, a five-volt terminal and a twelve-volt terminal, wherein each of said of standard DC output terminal includes a threaded locking hole disposed thereon;

a cable ring terminal includes a cable ring provided for collecting and attaching a group of output cables therein to connect to one of said standard DC output terminals, said cable ring terminal further includes a locking ring attached to said cable ring by an upwardly extended vertical neck wherein said locking ring is provided to engage to said threaded locking hole disposed on said standard DC output terminal for securely screwed thereon by a locking screw whereby said group of output cables bounded in said cable ring can be securely connected to one of said standard DC output terminals.

2. The power supply system of claim 1 wherein:

said cable ring terminal further includes a horizontal neck connected to a lower end of said vertical neck and to said locking ring whereby said locking ring extends laterally away from said cable ring such that said locking screw can be conveniently screwed onto said threaded locking hole through said locking ring.

3. The power supply system of claim 2 wherein:

said cable ring terminal further includes a second cable ring and a second vertical neck, connected between said second cable ring and said horizontal neck, for collecting and attaching a second set of power cables therein whereby said standard DC output terminal can be conveniently connected to said power cables in bounded by said cable rings.

4. The power supply system of claim 2 wherein:

said locking ring further includes a pair of legs for engaging said standard DC output terminal for preventing said cable ring terminal from rotating against said standard DC output terminal in applying said locking screw to securely attach said locking ring onto said threaded locking hole on said standard DC output terminal.

5. The power supply system of claim 2 wherein:

said cable rings further includes an insulating protective layer covering thereon for insulating and protecting said cable ring and said power cables to be collected and attached therein.

6. A method for designing and manufacturing a PC power supply system for providing power to a plurality of PC subsystems from an external power source comprising:

forming an AC to DC conversion circuit on a printed circuit board (PCB) for converting an AC voltage from said external power source to several standard subsystem DC voltages for said PC; and forming a plurality of standard DC output terminals corresponding to one of said several standard subsystem DC voltages for connecting to a set of output cables to provide one of said standard subsystem DC voltages therefrom to each of said subsystems in said PC;

receiving a personal computer system specification defining a plurality of PC subsystems and corresponding subsystem power requirements; and designing and manufacturing an output (O/P) cable includes a plurality of O/P cable groups and connecting said O/P cable groups to said standard DC output terminals on said PCB by employing a cable ring terminal having a cable ring to collect and attach output cables in each of said cable groups and using a locking ring to securely attach said cable group to said standard DC output terminals on said PCB according to said PC system specification and said subsystem power requirements.

* * * * *